INVENTOR.
HARRIS A. STOVER

BY Moody & Hallacher

ATTORNEYS

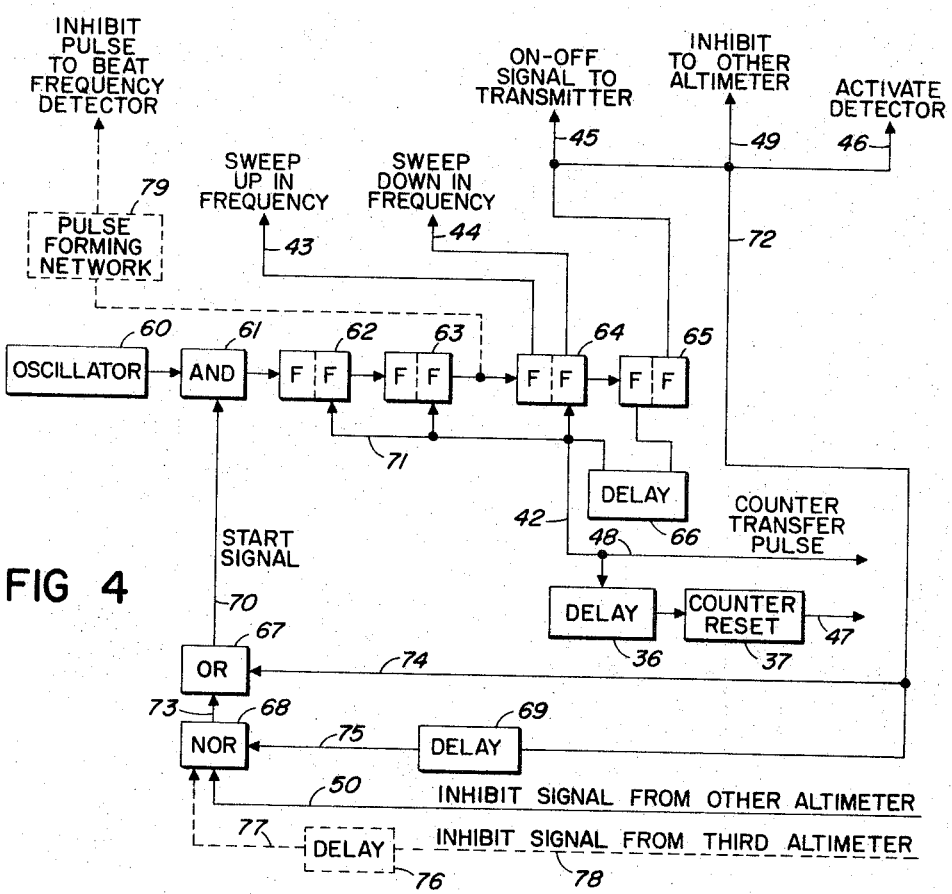

United States Patent Office 3,336,593
Patented Aug. 15, 1967

3,336,593
ASYNCHRONOUS TIME SHARING SYSTEM FOR MULTIPLE FM ALTIMETER
Harris A. Stover, Cedar Rapids, Iowa, assignor to Collins Radio Company, Cedar Rapids, Iowa, a corporation of Iowa
Filed Mar. 21, 1966, Ser. No. 535,850
9 Claims. (Cl. 343—12)

ABSTRACT OF THE DISCLOSURE

This invention describes a redundant electronic system which employs at least two, and preferably three or more, identical electronic subsystems to insure continuous and accurate operation in the event of a failure of one of the subsystems. The identical subsystems are interconnected such that only one subsystem contributes to the total system output at a given instance but all subsystems contribute to the total output over a given period of time. This is accomplished by designing the overall redundant system to have a continuous repetitive output, for example, a sinusoidal waveform. The identical electronic subsystems operate sequentially such that one portion of the total system output is contributed by the first identical subsystem. This subsystem is then turned off and the next identical subsystem is turned on and its output serves as the next portion of the total system output such that the output of the overall system is continuous. The individual similar subsystems each generate a start pulse and an inhibit pulse. The start pulse starts the operation of the overall redundant system while the inhibit pulse is used to inhibit the other identical electronic subsystems. At the end of the selected operating time of the first identical subsystem, for example, the generation of 360° of the sinusoidal output, the first identical subsystem is turned off which removes the inhibit signal from the second identical subsystem which then generates the second 360° of the total output. In the event of a failure of one of the identical subsystems it does not generate an inhibit signal and therefore the remaining identical subsystems continue to operate as if the failed system were not incorporated into the equipment.

This invention relates generally to redundant electronic systems and particularly to a timing system which permits alternate or sequential operation of redundant electronic systems.

Many electronic systems used in present day equipment are vitally important to the safe or intended operation of the system and therefore must necessarily enjoy a very high degree of reliability. Examples of such systems are the manned and unmanned space projects, military and commercial communications equipment, and military and commercial navigation equipment. The reliability requirement has resulted in the use of redundant equipment throughout the overall system. By using redundant, or multiple, identical equipment, failure of one piece of equipment is not fatal because another equipment is available to assume the functions of the disabled equipment.

It is therefore an object of this invention to provide a reliable redundant electronic system. Although the system herein described can be used in a large variety of electronic equipment, as set forth hereinabove, it is described in the environment of a radar altimeter in order to better illustrate the novelty and operation of the invention. However, it is emphasized that the scope of the invention is not limited to radar altimeters or to radar.

The primary purpose of multiple radar altimetry is to insure reliability and confidence that the system is giving the correct altitude reading. If as an aircraft proceeds or descends through an overcast the pilot is not sure that the indicated altitude is correct the confidence of the pilot may be shaken and the safety of the aircraft is decreased.

One method of overcoming this problem is the provision of redundant equipment in the aircraft. In such systems a plurality of identical radar sets are installed so that upon failure of one set the others are still present. Also the readings obtained from the second system can be compared to obtain a more reliable reading. Therefore if, for example, three altimeters all give the same reading the pilot can land, or proceed, with relative confidence. If one of the reading differs from the other two, it can be assumed that the two which are alike are correct. However, in order to insure this confidence in the overall multiple radar systems, it must also be assured that each of the several radar sets does not interfere with the others contained in the same system. This is the application of the system herein described—to provide interference-free multiple radar operation with the associated operational reliability. The system herein described performs this function with identical units for each radar set and allows other units to continue to operate if one or more units should fail. The system as described can be used with two or more radar sets. However, three is the preferable number as this number will have multiple sets in operation a large percentage of the time.

It is therefore an object of this invention to provide an increased reliability redundant radar system which increases the safety of aircraft during foul weather flying and landing.

It is another object to provide such a system in which the several radar sets in the system are alternately or sequentially activated and inhibited to prevent interference among the several sets.

It is another object to provide such a system in which a timing means sequentially or alternately activates and inhibits the several radar sets, times the sweep frequency, provides reset pulses and transfer the several radar sets into operation.

Another object of this invention is to enhance the reliability of a redundant electronic equipment by the provision of a timing circuit which sequentially actuates and inhibits a multiple number of similar electronic systems in the redundant equipment such that only one system operates at a given time but each contributes to the normal operation over a period of time.

Further objects, features, and advantages of the invention will become apparent from the following description and claims when read in view of the accompanying drawings wherein like numbers indicate like parts and in which:

FIGURE 4 shows the circuitry used in the timing circuit to activate and inhibit the individual radar sets; and FIGURE 5 shows the pulse sequence of the timing circuit flip-flops.

A brief explanation of FM radar altimetry is useful before describing the invention. FM radio altimeters normally consist of a radio transmitter which is frequency modulated, usually by a triangular waveform, plus a receiver. A signal is transmitted and reflected back; the time required for the reflected signal to return is a measure of the distance between the transmitter and the reflecting surface. Therefore the amount of delay in a signal transmitted from an aircraft and returned from the ground is a measure of the altitude of the aircraft. This time delay results in a frequency difference between the transmitted and received signals since the frequency modulation will have changed the transmitter frequency during the time that the received signal has been making its round trip to the ground and back.

Figure 1:
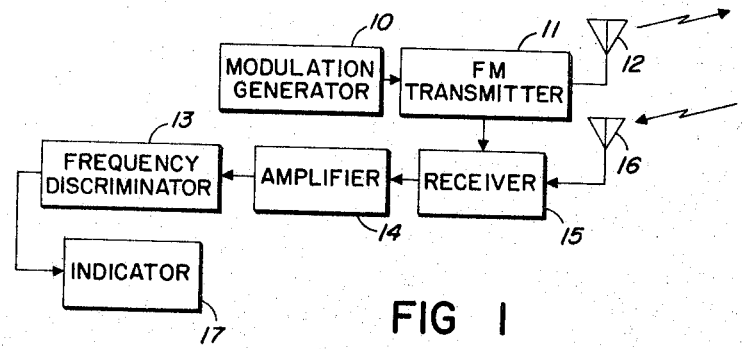
FIGURE 1 shows a block diagram of a single set radar altimeter set which is useful in explaining the operation of FM radar altimeter systems.

As seen in FIG. 1 a continuous sample of the transmitter output is supplied to receiver 15. Therefore both the transmitted and received signals are simultaneously present in the receiver. The presence of both signals results in a beat frequency equal to the difference in their frequencies which is a function of the time delay in the reflected signal. Because the beat frequency is proportional to the delay between the transmitted and received signal it is a measure of the altitude of the aircraft. The beat frequency may be defined as $$f_b = \frac{df_t}{dt} \frac{2R}{c}$$

where $f_b$ is the beat frequency, $$\frac{df_t}{dt}$$

is the rate of change of the transmitter frequency, R is the range and c is the speed of propagation of the transmitted signal, which for radar is the speed of light.

A typical system is shown in the simplified block diagram in FIGURE 1. This figure shows the well-known type of radar altimeter system in which a modulator 10 drives an FM transmitter 11 the output of which is fed to an antenna 12. At the same time the transmitter output is fed to antenna 12 a continuous sample of the output is also fed to the receiver 15. The transmitted signal is reflected back to antenna 16 of the receiver and because of the presence of both the transmitted and received signal in the receiver a beat frequency results. This beat frequency is measured by a frequency detector 13 and the resulting measurement relayed to an indicator 17. The beat frequency is a direct measurement of the time required for the signal to be transmitted to and reflected back from the reflecting medium and therefore is a direct measurement of the distance between the transmitter and the reflecting medium.

Figure 2:
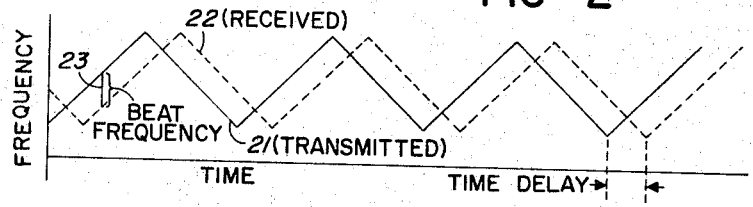
FIGURE 2 shows the time delay and resulting frequency difference between a transmitted and received triangular signal.

Referring now to FIG. 2, it is seen that with the transmitted signal represented by the solid line 21 and the received signal represented by the dotted line 22, an increase in the time delay of the received signal will cause an increase in the frequency difference at a given instant and thus indicate a greater altitude. The beat frequency is the frequency difference between the two signals at a given time, represented by line 23. The figure also shows that the beat frequency is zero shortly after each change of slope of the transmitted signal. This occurs when the transmitted and received signals cross.

Figure 3:
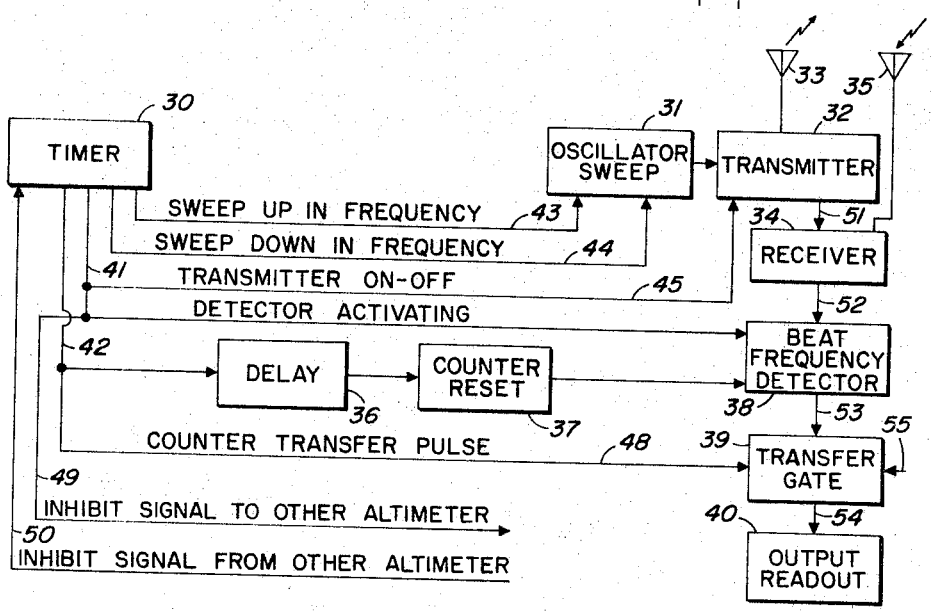
FIGURE 3 shows one radar altimeter set as it would be used in the redundant systems described herein.

It is readily apparent that the simultaneous operation of two identical systems on the same aircraft is desirable to provide measurement assurance in case of failure of one system as discussed earlier. However, it is quite apparent that there is a likelihood that the two identical systems will interfere with one another since they will be operating at the same time in the same frequency range. Although the interference may be reduced by synchronizing the two modulation signals so that they always have a considerable phase difference, the problem will still exist. The elimination of this problem is achieved by the asynchronous time-sharing system described herein, in which only one of the transmitters is on at a given time. Basically the inventive system operates as follows: when a given transmitter is activated, it transmits one complete sawtooth of frequency while at the same time inhibiting the second transmitter from being activated. At the end of the saw-tooth cycle the inhibit signal is removed from the second transmitter (or any other transmitters in the redundant system) and the second transmitter makes one complete cycle while inhibiting the first transmitter. If one transmitter fails it will not inhibit the remaining transmitter and the remaining transmitter will continue to make full saw-tooth sweeps. Thus, each full saw-tooth sweep is made and timed individually during the alternate operation of the redundant system. Reference is now made to FIG. 3, which shows one of the radar sets used in the redundant system. The overall redundant system would contain at least two, and preferably three, sets identical to the one shown in FIG. 3.

In FIGURE 3 an ordinary radar altimeter system has been modified in such a manner that the transmitter is turned on and off in accordance with signals generated in timer 30. It should be noted that oscillator 31, transmitter 32, receiver 34, beat frequency detector 38 and output readout 40 are respectively analogous to modulator 10, transmitter 11, receiver 15, discriminator 13 and indicator 17 of FIGURE 1.

Upon actuation of timer 30 an activating signal is sent via line 45 to transmitter 32 which turns the transmitter on. At this instant the transmitter can start transmitting and the receiver 34 is prepared to receive the reflected signal. The same signal which turns transmitter 32 on is also fed via line 46 to beat frequency detector 38 to thereby activate this detector. Simultaneously, with this signal an inhibit signal is sent via line 49 to the timer of any other altimeter which forms a part of the redundant system. Also upon actuation of timer 30 a counter transfer pulse is sent to transfer gate 39 to thereby actuate said gate and enable the reading from beat freqeuncy detector 38 to be relayed to output readout 40. It is now evident that upon actuation of timer 30 oscillator 31 is initially fed a sweep-up in frequency signal which causes the oscillator to generate the positive slope of a saw-tooth frequency modulated pulse train. Upon completion of the positive slope the oscillator receives the sweep-down in frequency signal which causes generation of the negative slope of the pulse train. The oscillator 31 has been therefore swept one sawtooth of frequency. This signal has been transmitted by transmitter 32 via antenna 33 and has simultaneously been sampled and sent to receiver 34 via line 51. The reflected signals are receiver on antenna 35 and forwarded to receiver 34 where a beat frequency is established because of the presence of the sampled transmitted signal. The beat frequency is detected and measured, or counted, in beat frequency detector 38. Because the transfer gate 39 is actuated by timer 30 momentarily at the conclusion of the counting period the count from the beat frequency detector is fed to output readout 40 where it is stored until the conclusion of another count period. As will be explained hereinafter, timer 30 is set up so that transmitter 32 will transmit only one sawtooth of the wave pulse. At the completion of this sawtooth there will be a slight delay before beginning the next sawtooth to permit time for an inhibit signal to be received from the other altimeter which will prevent starting a new timing cycle 30. The temporary inactivation of timer 30 removes the inhibit signal going to the other altimeter from line 49 and thereby enables the other altimeter to begin its timing cycle and to generate and transmit another sawtooth of the pulse train. The inactivation of timer 30 also removes the actuation signal going to beat frequency detector 38. This disables the detector. The counter transfer pulse from timer 30 is also fed to transfer gate 39 to transfer the output of beat frequency detector 38 to the output readout 40. The same pulse is fed through delay 36 before being fed to counter reset 37 to allow time for the output of frequency detector 38 to be transferred to output readout 40 before the frequency counter 38 is reset. The delay 36 is sufficiently short to allow the beat frequency detector to be reset and be ready for another count upon the next actuation of timer 30. Upon actuation of the other altimeter a different counter tansfer pulse is received by transfer gate 39 via line 55 from the other altimeter. This enables the indication from the beat frequency detector contained in the other altimeter to be transferred to the output readout 40. Upon completion of the transmission of one sawtooth of the waveform by the other altimeter the inhibit signal from this altimeter going to timer 30 will be removed and timer 30 will thereby be reactuated. Upon this reactuation timer 30 sends another inhibit signal to the other altimeter which disables said altimeter during the generation of another sawtooth by transmitter 32. It is therefore evident that the two separate altimeters alternately operate so long as both are operational and functioning properly.

Assuming that the other altimeter fails, the inhibit signal from the altimeter will not be fed to timer 30. Therefore timer 30 will not be shut down upon completion of the transmission of a sawtooth and therefore transmitter 32 will go into nearly continuous operation with only a very slight delay between sweeps, which would permit the other altimeter to begin its sweep and inhibit this one if the other altimeter had been in operating condition and the aircraft will still be equipped with an operational altimeter.

FIGURE 4 is a more detailed showing of timer 30 and is useful in explaining how to obtain the timing sequence necessary to obtain the alternate operation of the several transmitters used in the redundant system.

An oscillator 60 provides the signal required to initiate and sustain the counter input. The counter is comprised of a series of well-known flip-flop circuits 62 to 65. In the embodiment shown four flip-flops are used because a count of 16 is desired. This count can be increased or decreased by changing the number of flip-flops employed. The precision of the count is dependent upon the precision of oscillator 60. However, so long as substantially similar oscillators are used in the several systems a high degree of precision in the oscillator is not required. Connected between oscillator 60 and the counter flip-flops 62-65 is an AND gate 61. The presence of AND gate 61 requires the presence of a starting signal on line 70 before the oscillator 60 output can reach flip-flop 62. The source of this starting signal will be explained hereinafter. A feedback line 71 containing delay 66 is connected across the counter circuits. This is used to reset the counter flip-flops to count 8 as shown in FIGURE 5. Outputs from the counter circuits are taken from flip-flops 63, 64 and 65. An output taken from flip-flop 65 is fed back to AND gate 61 via two paths. The first feedback path consists of line 74 and OR gate 67 and the second consists of line 75, delay 69 and NOR gate 68. The purpose of these feedback lines is explained hereinbelow.

FIGURE 4 shows that up frequency sweep line 43 and down frequency sweep line 44 are respectively taken from the left and right sides of flip-flop 64. The transmitter on signal, detector activating signal, and inhibit signal to the other system are taken from the output of flip-flop 65. The counter transfer pulse is taken from the feedback line 71 after it is delayed by delay 66. This signal also provides the counter reset pulse after being delayed on line 47 by delay 36.

Upon actuation of oscillator 60 a pulse is fed to AND gate 61. In the absence of an inhibit signal from the other altimeter on line 50 or an output from delay 69 a pulse will appear at the output of NOR gate 68. This pulse is relayed through OR gate 67 to AND gate 61. Because there is a signal present on both the inputs to AND gate 61 the oscillator output is relayed to the counter circuit consisting of flip-flops 62 through 65. Because four flip-flops are used in the counting circuit a count of eight pulses is required before flip-flop 65 produces an output signal on line 45. The ninth pulse causes a change of state of the output of flip-flop 65 as shown in Step 9 of the diagram in FIGURE 5. With the output pulse present the output of flip-flop 65 is fed to line 45 where it turns on transmitter 32, to line 49 where it acts as an inhibit to the other altimeter holding it in an inactive state and to line 46 to activate beat frequency detector 38. This pulse is present for eight counts which carries through Step 16 as shown in FIGURE 5. The next pulse puts the count in Step 1 of FIGURE 5; at this point there is no output present on flip-flop 65 and therefore the transmitter 32 is turned off and no longer transmits. It should be noted that flip-flop 64 on one side produces the sweep-up slope, increasing frequency portion of the sawtooth, of the transmitted pulse. This corresponds to Steps 9 through 12 of FIGURE 5 and the other output of flip-flop 64 produces the down sweep of the pulse, decreasing frequency portion of the sawtooth which corresponds to Steps 13 through 16 of FIGURE 5. The delay 66 is such that upon switching of flip-flop 65 from state 16 of FIGURE 5 to state 1 of FIGURE 5 flip-flops 62, 63, and 64 are reset to Step 8 skipping states 2, 3, 4, 5, 6, and 7 of FIGURE 5. For this reason, as soon as a signal is present on input 70 of AND 61 the first pulse will change the count from that of Step 8 and therefore an output will immediately be present on lines 45, 46, and 49 from flip-flop 65. The absence of an output on flip-flop 65, states 1 through 8 of FIGURE 5, also removes the inhibit signal from line 49 which is fed to the other altimeter. At this instant the other altimeter can be turned on which will place an inhibit signal on line 50 and thereby prevent a signal from being present on line 70 of AND 61. The absence of a signal on line 70 prevents the oscillator output from going to the counter flip-flops 62-65 and therefore transmitter 32 remains off.

It should be noted that the output of flip-flop 65 is fed back to NOR gate 68 through delay 69. The signal fed back to NOR 68 is delayed a sufficient amount of time to enable the inhibit signal from the other altimeter to arrive at NOR 68. This gives the other altimeter an opportunity to go into operation before the first altimeter starts a second cycle. The output of flip-flop 65 is also fed back to OR gate 67. This feedback keeps a signal present on line 70 and thereby keeps the oscillator 60 output being fed to the counter flip-flops through AND gate 61 until the completion of the full transmit cycle. Assuming that the other altimeter is disabled and therefore cannot go into operation no inhibit signal will be received on line 50. As soon as the input 75 is removed from NOR 68 after being delayed by delay 69 a signal is present at the output of the NOR and therefore AND gate 61 is opened and the oscillator output can go through to actuate the counter flip-flops and consequently timer 30 will begin a new cycle.

If a three altimeter system is used, a second inhibit circuit is also fed to NOR gate 68 as shown in dotted lines in FIGURE 4. The presence of a signal on either line 50 or line 77 will prevent the output from oscillator 60 from reaching the timer flip-flops and thereby inactivate transmitter 32 until they are removed. Therefore the three different transmitters composing the overall system will sequentially operate with each being on one-third of the total time. When such a system is used the delay in delay circuit 69 must be made somewhat longer than in a two-altimeter system in order to give both of the other two systems time to generate an inhibit signal before oscillator 60 goes back into operation.

Referring back to the diagram of FIGURE 2 it is noted that the beat frequency is not correct for a brief period shortly after each slope reversal. Since this period of inaccuracy varies with altitude, it is desirable to avoid the inaccuracy. The timer may be used to accomplish this result also. Note from FIGURES 4 and 5 that flip-flop 64 changes state every time a sawtooth starts and every time the sweep reverses direction. Thus the pulse which causes the flip-flop 64 to change state may also be used to drive a pulse-forming network 79 which forms an inhibit pulse which has a pulse length equal to the longest period of the inaccurate beat frequency which the system will encounter during operation. This pulse is then used to inhibit beat frequency detector 38 this period. The length of time that the counter is inhibited is dependent on the delay built into network 79 which is a constant and therefore no error will result for variations in altitude.

With a sawtooth period of .01 second, approximately 45 readings are taken each second by each system of a dual system so that the system response may be made quite fast. The dual system is interference free because only one transmitter is on at a time and the transmitter that is turned off cannot interfere with the one that is in operation.

Reference to FIGURE 4 readily reveals that the invention is not limited to radar altimeters in that the transmitter on-off pulse can easily be adapted to turning on and off any type of electronic equipment.

Although this invention has been described with respect to a particular embodiment thereof, it is not to be so limited as changes and modifications may be made therein which are within the spirit and scope of the invention as defined by the appended claims.

I claim:

1. A redundant electronic system comprising: a plurality of similar electronic utilization means, each of said utilization means including timing means, signal transfer means connected to receive the output of each of said timing means, output readout means for receiving the output of said transfer means so that the output of only one of said utilization means actuates said readout means at a given time, each of said timing means comprising: signal producing means for simultaneously producing start signals, transfer signals and inhibit signals; counter means; gate means for connecting said signal producing means to said counter means; and gate control means for opening said gate means in accordance with start signals received from said signal producing means contained in the same timing means and closing said gate means in accordance with inhibit signals received from the signal producing means of said other timing means so that the total output of said redundant electronic system is composed of the serial combination of the outputs of said plurality of similar electronic utilization means.

2. The system of claim 1 including means for feeding back the output of said counter means to said gate means so that said gate means remains open when said gate control means permanently fails to receive an inhibit signal.

3. The system of claim 1 including means for resetting said counter means to a preselected count.

4. The system of claim 2 wherein said counter means comprises a plurality of cascade connected flip-flop circuits.

5. The system of claim 2 wherein said gate control means is a NOR gate.

6. The system of claim 2 including second means for feeding back said counter means output to said gate means, said second feedback means including delay means.

7. A redundant electronic system having a repetitive continuous output and comprising a plurality of similar electronic units sequentially operating so that said output is composed of the serial combination of the outputs of said units, each of said similar electronic units comprising: electronic utilization means, timing means, a detector for receiving the output of said utilization means, said timing means sequentially generating on and off signals to sequentially actuate and deactuate said utilization means, said timing means also generating a transfer signal and an inhibit signal, said on and off signals, said transfer signal and said inhibit signal being simultaneously generated, means for coupling said inhibit signal to each of said other electronic units while said on signal is present, signal transfer means for receiving the outputs from each of said detectors, said signal transfer means also receiving said transfer signal from the timing device generating said on signal, output readout means receiving the output of said signal transfer means so that said readout means receives a signal from only the utilization means receiving an on signal at a given time as the others of said similar units are inhibited by said inhibit signal.

8. The system of claim 7 wherein said similar electronic units are radar altimeter sets and said detector is a beat frequency detector.

9. The system of claim 7 wherein said timer comprises: signal producing means; counter means; gate means for connecting said signal producing means to said counter means; and gate control means for opening and closing said gate means in accordance with start and inhibit signals received by said gate control means so that the output of said signal producing means actuates said counter means only when said gate means is open.

References Cited

UNITED STATES PATENTS

| | | | |
|---|---|---|---|
| 2,953,694 | 9/1960 | Wilson | 340—167 |
| 2,991,449 | 7/1961 | Lee | 340—147 |
| 3,167,767 | 1/1965 | Capelli | 343—14 |
| 3,226,569 | 12/1965 | James | 307—88.5 |
| 3,258,607 | 6/1966 | Wright et al. | 307—88.5 |
| 3,267,303 | 8/1966 | Meyer et al. | 307—141 |

RODNEY D. BENNETT, *Primary Examiner.*

J. P. MORRIS, *Assistant Examiner.*